United States Patent
Dankovich

(10) Patent No.: US 11,803,246 B2
(45) Date of Patent: Oct. 31, 2023

(54) SYSTEMS AND METHODS FOR RECOGNIZING GESTURE

(71) Applicant: University of Maryland, College Park, College Park, MD (US)

(72) Inventor: Louis J. Dankovich, Hyattsville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/000,262

(22) Filed: Aug. 21, 2020

(65) Prior Publication Data

US 2021/0223868 A1 Jul. 22, 2021

Related U.S. Application Data

(60) Provisional application No. 62/890,462, filed on Aug. 22, 2019.

(51) Int. Cl.
*G06F 3/01* (2006.01)
*G06N 20/00* (2019.01)

(52) U.S. Cl.
CPC .............. *G06F 3/017* (2013.01); *G06F 3/011* (2013.01); *G06N 20/00* (2019.01)

(58) Field of Classification Search
CPC ................................. G06F 1/163; G06F 3/017
See application file for complete search history.

(56) References Cited

U.S. PATENT DOCUMENTS

| | | | | |
|---|---|---|---|---|
| 2014/0240223 A1* | 8/2014 | Lake | ........................ | G06F 3/017 345/156 |
| 2015/0148641 A1* | 5/2015 | Morun | .................... | H05K 1/162 600/372 |
| 2016/0261353 A1* | 9/2016 | Ying | ........................ | G06F 1/163 |
| 2016/0338644 A1* | 11/2016 | Connor | .................... | A61B 5/11 |
| 2017/0192505 A1* | 7/2017 | Ding | ..................... | G06F 3/0219 |

(Continued)

OTHER PUBLICATIONS

Hoang Truong, et al., "Capacitive Sensing 3D-printed Wristband for Enriched Hand Gesture Recognition", University of Colorado Boulder, {hoang.truong, vp.nguyen, anh.tl.nguyen, nam.bui, tam.vu}@colorado.edu, Jun. 19, 2017.

(Continued)

*Primary Examiner* — Matthew A Eason
*Assistant Examiner* — Chayce R Bibbee
(74) *Attorney, Agent, or Firm* — Carter, DeLuca & Farrell LLP; George Likourezos

(57) ABSTRACT

A gesture recognizing system for recognizing gestures includes a wearable band configured to wrap around an appendage of a user and a printed circuit board (PCB). The wearable band includes a first dielectric layer and a plurality of electrodes affixed on an outer surface of the first dielectric layer. When the first dielectric layer of the wearable band wraps around the appendage, each electrode is configured to form a capacitive sensor with skin of the user. The PCB includes a processor and a data collection hardware configured to collect data from capacitive sensors. The processor is configured to process the collected data and to recognize a gesture of the appendage of the user based on the processed data.

20 Claims, 7 Drawing Sheets

(56) References Cited

U.S. PATENT DOCUMENTS

2020/0068708 A1* 2/2020 Longinotti-Buitoni ...................... G16Z 99/00

OTHER PUBLICATIONS

Massimo Totaro, et al., "Soft Smart Garments for Lower Limb Joint Position Analysis", Sensors, Oct. 12, 2017.

Tien-Wei Shyr, et al., "A Textile-Based Wearable Sensing Device Designed for Monitoring the Flexion Angle of Elbow and Knee Movements", Sensors, ISSN 1424-8220, www.mdpi.com/journal/sensors, 2014.

Theresa Roland, et al., "Signal evaluation of capacitive EMG for upper limb prostheses control using an ultra-low-power microcontroller", EEE EMBS Conference on Biomedical Engineering and Sciences (IECBES), 2016.

Jun Rekimoto, "GestureWrist and GesturePad: Unobtrusive Wearable Interaction Devices", http://www.csl.sony.co.jp/person/relimoto.html, IEEE, 2001.

R. Bartalesi, et al., "Wearable monitoring of lumbar spine curvature by inertial and e-textile sensory fusion", 32nd Annual International Conference of the IEEE EMBS Buenos Aires, Argentina, Aug. 31-Sep. 4, 2010.

Mahmoud Abduo, et al., "Myo Gesture Control Armband for Medical Applications", Department of Computer Science and Software Engineering University of Canterbury, Oct. 16, 2015.

* cited by examiner

SYSTEMS AND METHODS FOR RECOGNIZING GESTURE

CROSS-REFERENCE TO RELATED APPLICATION/CLAIM OF PRIORITY

This application claims the benefit of, and priority to, U.S. Provisional patent Application No. 62/890,462, filed on Aug. 22, 2019, of which the entire contents are hereby incorporated herein by reference.

GOVERNMENT LICENSE RIGHTS

This invention was made with government support under W911NF1510358 awarded by the United States Army Research Office and FA95501410398 awarded by United States Air Force Office of Scientific Research. The government has certain rights in the invention.

FIELD

The present disclosure relates to systems and methods for recognizing gestures and, in particular, to systems and methods for recognizing gestures by using capacitive sensors.

BACKGROUND

Exoskeletons and wearable robotics have been emerging as a technology capable of enhancing the lives of the injured and elderly. They have offered attractive methods of providing mobility assistance, stroke rehabilitation, and general physical therapy. While physical actuation has improved over recent years, there is still significant room for growth in systems for recognizing user intent and, specifically for recognizing gestures and motions.

For wide adoption, gesture recognition systems should be robust, low cost, accurate, easy to implement, and comfortable enough for daily wear. The current landscape for gesture recognition has several competing technologies attempting to fill this niche including surface electromyography (sEMG), force myography (FMG), and electrical impedance tomography (EIT). All of these technologies have limitations within these metrics.

sEMG uses small electrodes to monitor the electrical signal of muscle neurons which control the muscles. While this is the clinical gold standard, the technology faces many challenges for widespread use outside the lab because electrode pads are expensive, and obtaining clean signals requires significant preparation of skin and very precise placement. Even under ideal scenarios, significant signal processing is required. sEMG also suffers signal drift over the course of the day, picks up environmental noise from electronics as well as neighboring muscle groups, and sweat can alter electrical signals. Further, the electrode pads might drift along the course of the day, thereby disrupting initial precise placement of the electrodes.

FMG measures radial pressure of muscles as they contract and has been used with machine learning algorithms to achieve promising results in recent years. However, it is dependent on many discrete sensors being placed over the thickest portion of forearm. This has several drawbacks including cost, the requirement of sensors to be worn directly against users' skin, and the potential for model accuracy to be diminished as sensors slip to different positions during normal motion.

EIT has also seen some use in gesture recognition. In this context a bracelet carrying an array of electrodes is worn on the arm and a signal is sent out by one of the electrodes. The other electrodes read the signal and compare it to the input to determine impedance. While this method can be highly accurate, it is indicated to be highly dependent on placing a sensor band at a specific location on the arm and requires direct skin contact.

These methods for measuring human motion are susceptible to electromagnetic noise, signal drift, cross-talk from neighboring muscle groups, impact from sweat and other complications due to contact with skin, and the corresponding equipment has been bulky. Therefore, there is a still significant room for growth in systems for recognizing gestures and motions that address these disadvantages and limitations.

SUMMARY

The present disclosure relates to gesture recognizing systems and methods for recognizing gestures based on a model and capacitance values between the skin of a user and capacitive electrodes. Further, to the extent consistent, any of the aspects described in this disclosure may be used in conjunction with any or all of the other aspects described herein.

In accordance with aspects of the disclosure, a gesture recognizing system for recognizing gestures includes a wearable band configured to wrap around an appendage of a user and a printed circuit board (PCB). The wearable band includes a first dielectric layer and a plurality of electrodes affixed on an outer surface of the first dielectric layer. When the first dielectric layer of the wearable band wraps around the appendage, each electrode is configured to form a capacitive sensor with skin of the user. The PCB includes a processor and a data collection hardware configured to collect data from capacitive sensors. The processor is configured to process the collected data and to recognize a gesture of the appendage of the user based on the processed data.

In various aspects, the appendage is a forearm or a lower leg.

In various aspects, the collected data includes capacitance values between the skin and the capacitive sensors.

In various aspects, the capacitance values are measured with the skin being a ground.

In various aspects, the capacitance values vary based on a change in shapes of muscles in a cross-sectional area of the appendage as a gesture of the appendage changes.

In various aspects, the gesture recognizing system further includes a plurality of wires, each wire being configured to connect a corresponding electrode to a corresponding port of the PCB. A sampling frequency of the capacitive sensors is at least about 10 Hz.

In various aspects, the gesture recognizing system further includes an analog to digital converter (ADC) configured to convert analog data from the capacitive sensors to digital data.

In various aspects, the processor recognizes the gesture according a model.

In various aspects, the first dielectric layer includes an attachment mechanism. The attachment mechanism includes a hook-and-loop fastener strap, a buckle, or a zipper configured to securely wrap the wearable band around the appendage.

In various aspects, the first dielectric layer is an elastomeric material.

In various aspects, the plurality of electrodes are stretchable.

In various aspects, the wearable band further includes a second dielectric layer affixed over the plurality of electrodes and the first dielectric layer.

In various aspects, the plurality of electrodes are substantially equally distributed along a length direction of the appendage.

In various aspects, at least one the plurality of electrodes is configured to wrap around an elbow of the user. The processor further recognizes a gesture of the elbow.

In accordance with aspects of the disclosure, a method for recognizing gestures of an appendage includes a modelling stage and a recognition stage. The modelling stage includes wrapping a wearable band around an appendage of a user, receiving first data from a plurality of capacitive sensors of the wearable band, where the first data includes capacitance values from the plurality of capacitive sensors and corresponding gestures of the appendage, and generating a model of the user from the first data by using a machine learning algorithm. The recognition stage includes wrapping the wearable band around the appendage of the user, receiving second data from the plurality of capacitive sensors, processing the second data, and recognizing a gesture of the appendage based on the processed second data and the model.

In accordance with aspects of the disclosure, a nontransitory computer-readable medium including instructions stored thereon that, when executed by a computer, cause the computer to perform a method for recognizing gestures of an appendage. The method for recognizing gestures of an appendage includes a modelling stage and a recognition stage. The modelling stage includes wrapping a wearable band around an appendage of a user, receiving first data from a plurality of capacitive sensors of the wearable band, where the first data includes capacitance values from the plurality of capacitive sensors and corresponding gestures of the appendage, and generating a model of the user from the first data by using a machine learning algorithm. The recognition stage includes wrapping the wearable band around the appendage of the user, receiving second data from the plurality of capacitive sensors, processing the second data, and recognizing a gesture of the appendage based on the processed second data and the model.

Further details and aspects of the present disclosure are described in more detail below with reference to the appended figures.

BRIEF DESCRIPTION OF DRAWINGS

Various aspects and features of the present disclosure are described hereinbelow with reference to the drawings wherein like numerals designate identical or corresponding elements in each of the several views.

DETAILED DESCRIPTION

Figure 1:
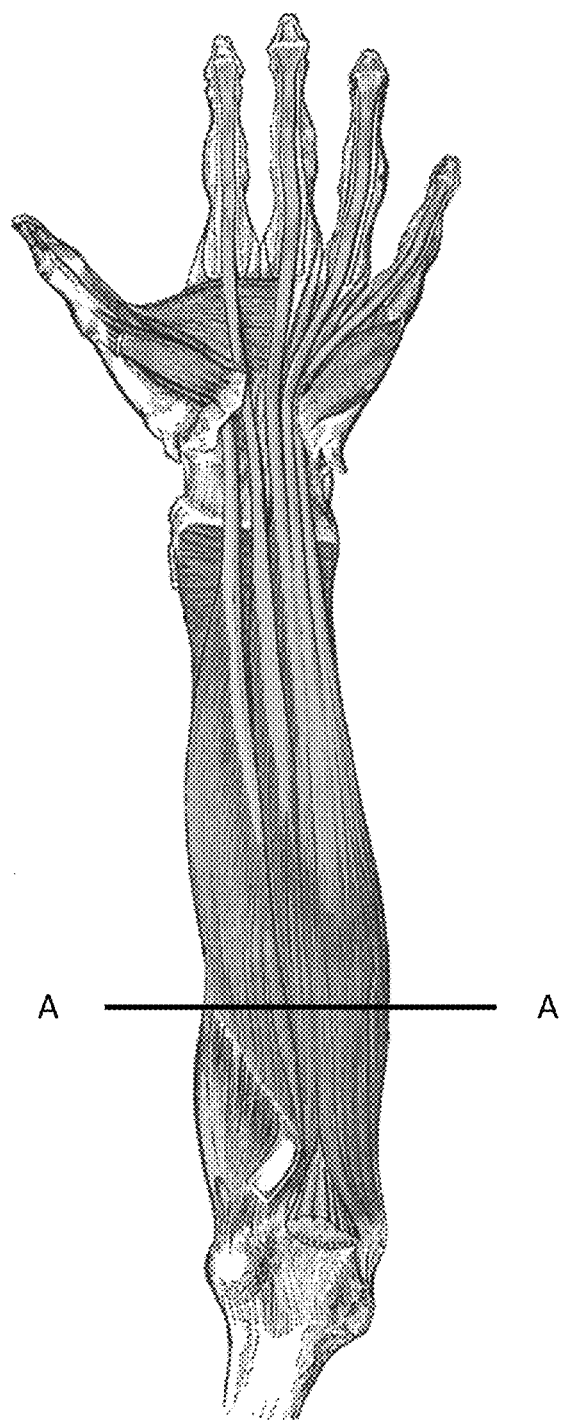
FIG. 1 is a graphical illustration of a forearm.

Provided in this disclosure is a wearable band to recognize a variety of gestures including hand motions and individual finger and wrist motions. The wearable band may include capacitive sensors using circumferential electrodes for gesture recognition. Data collected from the circumferential electrodes are processed by machine learning models to generate a model, which is used to recognize gestures based on measurement data from the electrodes.

Capacitive sensors or continuous electrodes wrap around the circumference of the forearm and generate changes of capacitive values from a number of muscles. The capacitive values are spatially integrated activity representation of multiple muscles at the same time to sense, recognize, and classify motions of a forearm, including wrist motions and hand motions. The wristband format for the capacitive sensors makes it easy to wrap the wearable band around the forearm and comfortable enough for long term wear. Because the capacitive sensors measure proximity rather than direct pressure, the wearable band can also be worn over clothing or bandages.

The present systems and methods of measurement in accordance with the present disclosure may be suitable for a variety of limb or appendage positioning situations, for example, for measuring and determining hand and forearm gesture, hand and finger grasping gesture, foot and ankle gestures, knee gesture, head gesture, and more. Thus, the forearm, which is used in this disclosure, may mean or refer to any portion of a limb from the tip thereof to a joint. In a similar way, a hand and a wrist may mean a foot and an ankle, respectively. Gestures in this disclosure may include relational positions between elbow, wrist, and hand, and further include a combination of positions and/or motions of the elbow, wrist, and hand. For example, gestures may include "closed fist, palm down, and bent elbow" or "closed fist, palm up, and straight arm."

Machine learning algorithm may include, but are not limited to, neural networks, deep neural networks, recurrent neural networks (RNN), deep learning through neural networks, generative adversarial networks (GAN), Bayesian Regression, Naive Bayes, Monte Carlo Methods, nearest neighbors, least squares, means, and support vector regression, long short term memory (LSTM), among other data science, artificial intelligence, and machine learning techniques. Exemplary uses are making a gesture model by correlating patterns of capacitance values from the wearable band and making predictions relating to gestures made by the limb, which will be described in more detail hereinbelow. The machine learning algorithm may be supervised or unsupervised.

The present systems can be easily implemented for use in applications including, but not limited to, smart prosthetics, rehabilitation training, therapeutics, athletic training and coaching, augmented and virtual reality interaction, computer interaction, gaming, and exoskeletons. Further, the systems according to the present disclosure are not limited to application to human beings but can be applicable to animals.

Figure 2:
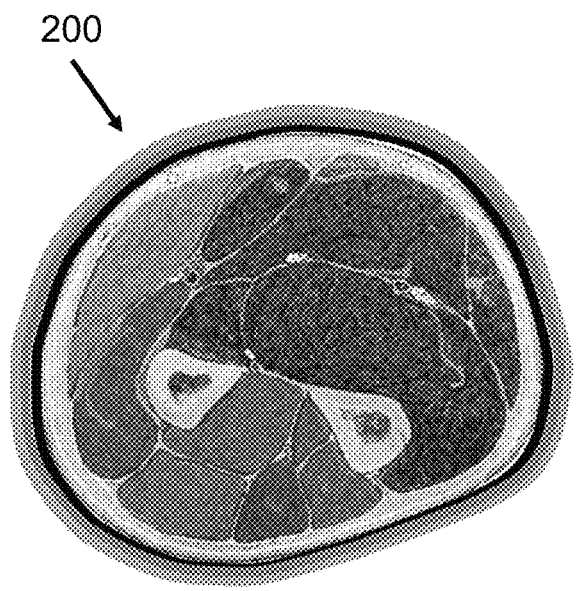
FIG. 2 is a cross-sectional view along A-A direction of the forearm of FIG. 1.

FIG. 1 illustrates the anatomy of a forearm from the elbow to the fingertip and FIG. 2 illustrates a cross-sectional view of the forearm 200. As shown, muscles, nerves, and bones are interconnected with each other within the forearm 200. For example, there are seven superficial muscles: brachioradialis, extensor carpi radialis longus and brevis, extensor digitorum communis, extensor digiti minimi, extensor carpi ulnaris, and anconeus. Also, there are deep muscles: supinator, abductor pollicis longus, extensor pollicis brevis, extensor pollicis longus, and extensor indicis proprius. These muscles work together to make specific gestures of the hand and the wrist. For example, to make a hand grip, extensor digitorum communis, extensor indicis, extensor carpi radialis longus, extensor carpi radialis brevis, and extensor carpi ulnaris flex or contract. In a similar way, portions of the muscles flex or contract to make other gestures.

When a muscle flexes, the muscle becomes thicker, and when the muscle contracts, the muscle becomes thinner. In consideration of the cross-sectional view as shown in FIG. 2, the circumference of the cross-section is maintained substantially constant, but the shapes of the muscles in the cross-section vary, while the muscles flex and contract. In particular, when a gripping gesture is made, the range of change in thickness of one muscle differs along the longitudinal axis of the forearm. Further, when the same gripping gesture is made, the range of change in thickness of other muscles also differs from each other along the longitudinal axis of the forearm. In other words, for the same gesture, the changes in the shapes of muscles in the cross-sectional area of the forearm differ along the longitudinal axis of the forearm. Thus, based on the changes in the shapes of muscles in the cross-sectional area in several places along the longitudinal axis of the forearm, a different capacitive profile for each motion is generated and a gesture may be recognized based on the capacitive profile.

Gestures may include and refer to movements of the hand, movements of the wrist, movements of the forearm, and combinations thereof. Similarly, gestures of a lower leg may be also recognized by wrapping the wearable band over a lower leg. Based on changes in the shapes of the muscles in the cross-sectional area in several places along the longitudinal axis of the lower leg, a gesture of the lower leg may be recognized. Gestures of the lower leg may include movements of the toes, movements of the ankle, movements of the lower leg, and combinations thereof.

In an aspect, gestures may further include force and position of each body part. For example, when a finger gesture is made, a position of the finger and a force output by the finger may be included in the gesture. When a hand gesture is made, a position of the hand, a force output by the hand, and an angle between the forearm and the hand may be included in the gesture. These pieces of information about the gesture may be applied to areas including prosthetics, rehabilitation, sports training, and any combination thereof.

Figure 3:
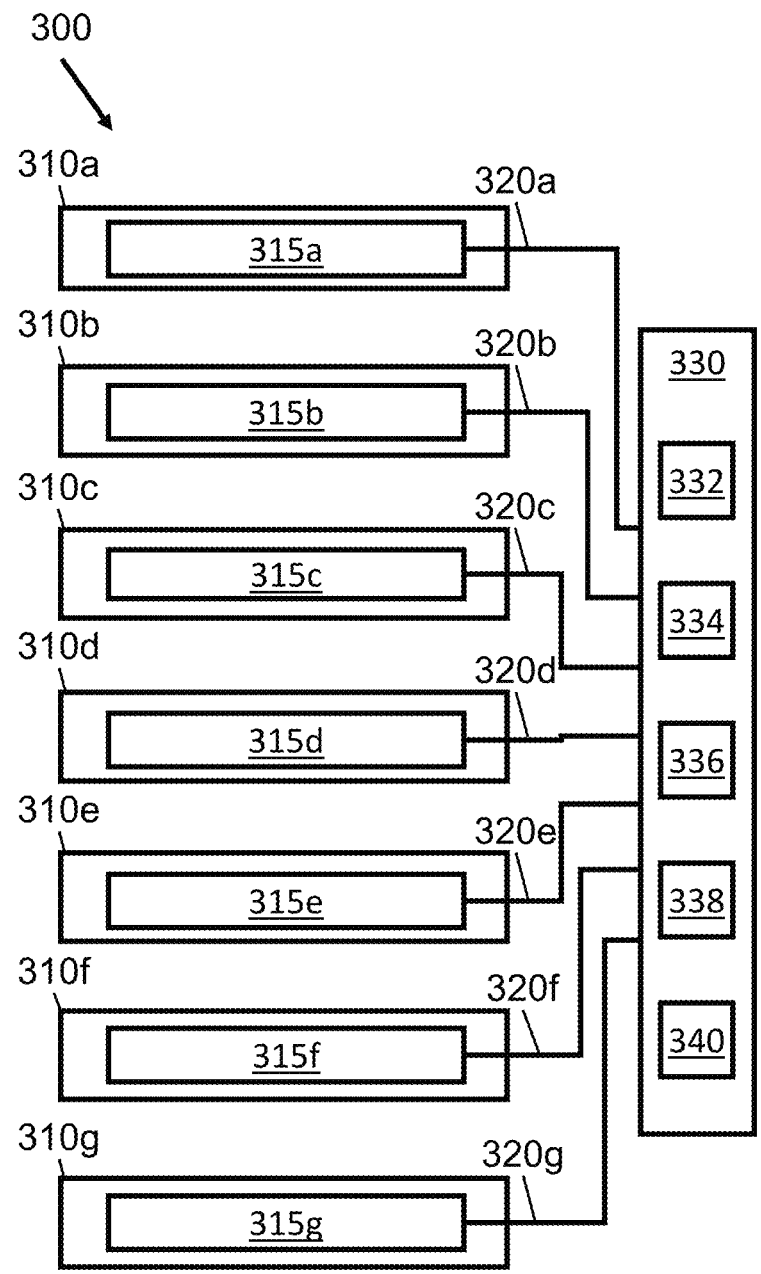
FIG. 3 is a block diagram of a gesture recognizing system in accordance with aspects of the present disclosure.

FIG. 3 shows a wearable band 300, which may be used to recognize a gesture, according to aspects of the present disclosure. The wearable band 300 may include a dielectric layer 310, electrodes 315a-315g, and a printed circuit board ("PCB") 330. The wearable band 300 may be used to wrap around a forearm of a user, to collect data from the electrodes 315a-315g of the wearable band 300, to train a machine learning algorithm, and to recognize a gesture based on measurements.

The dielectric layer 310 may touch the skin of the forearm when the wearable band 300 wraps around the forearm. The dielectric layer 310 may include an attachment mechanism so that the wearable band 300 may be securely aligned with the forearm. The attachment mechanism may include but not limited to a snag-free hook-and-loop fastener tape, hook-and-loop fastener strap, or buckle configured to securely wrap the wearable band 300 around the forearm. The attachment mechanism may be incorporated with the dielectric layer 310.

In an aspect, the dielectric layer 310 may be stretchable or flexible. For example, the dielectric layer 310 may be made of a fabric, which is not conductive and can include but not limited to nylon. The dielectric layer 310 may be a contiguous elastomeric substrate. For example, a stretch Lycra® sleeve may be used as the dielectric layer 310 without using buckles, straps, or hook-an-loop fastener.

In another aspect, the dielectric layer 310 may include a number of dielectric layers 310a-310g, which correspond to the number of the electrodes 315a-315g. When the phrase "dielectric layer 310" is used below, it collectively refers to the dielectric layers 310a-310g, and when the phrase "electrode 315" is used below, it collectively refers to the electrodes 315a-315g. The number of dielectric layers 310 or of the electrodes 315 may be greater than or equal to two.

The electrode 315 may be a copper tape, of which width ranges from about 6.3 mm to about 19 mm. The electrode 315 may be sewn on or affixed to the dielectric layers 310. In an aspect, the electrode 315 may be made of conductive fabric, printed conductive ink, any conductive material. In an aspect, adhesive, which is also stretchable as the dielectric layer 310 and the electrode 315 are stretchable, may be used to affix the electrode 315 to the dielectric layer 310. Spacing between the electrodes 315 may be about 22 mm apart. In an aspect, the width of the electrodes 315 and the space between the electrode 315 may be adjusted so as to substantially cover the length of the forearm of the user.

The PCB 330 may also be attached to the dielectric layer 310. The attachment may be made through the hook-and-loop fastener (e.g., Velcro®) or adhesive. The PCB 330 may cover the electrode 315. A processor 332 and a memory 334 are soldered within the PCB 330 and are integrated with the PCB 330 so that the processor 332 and the memory 334 can collect data from the electrode 315, process the data, and recognize a gesture based on the processed data. The PCB 330 may further include an input module 336, a display 338, and a network interface 340. In an aspect, the PCB 300 may include, by way of non-limiting examples, server computers, desktop computers, laptop computers, notebook computers, sub-notebook computers, netbook computers, netpad computers, set-top computers, handheld computers, Internet appliances, smartphones, tablet computers, personal digital assistants, and embedded computers.

In some aspects, the computing device 320 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some aspects, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

The memory 334 may store data or programs on a temporary or permanent basis. In some aspects, the memory 334 may be volatile memory and require power to maintain stored information. In some aspects, the memory 334 may be, or also include, non-volatile memory and retain stored information. In some aspects, the non-volatile memory includes flash memory. In some aspects, the non-volatile memory includes dynamic random-access memory (DRAM). In some aspects, the non-volatile memory includes ferroelectric random-access memory (FRAM). In some aspects, the non-volatile memory includes phase-change random access memory (PRAM). In some aspects, the memory 334 includes, by way of non-limiting examples, CD-ROMs, DVDs, flash memory devices, magnetic disk drives, magnetic tapes drives, optical disk drives, and cloud computing-based storage. In some aspects, the memory 334 may be a combination of devices such as those disclosed herein.

The processor 332 executes instructions which implement tasks or functions of programs. When a user executes a program, the processor 332 reads the program stored in the memory 334, loads the program on the RAM, and executes instructions prescribed by the program.

The processor 332 may include a microprocessor, central processing unit (CPU), application specific integrated circuit (ASIC), arithmetic coprocessor, graphic processor, or image processor, each of which is electronic circuitry within a computer that carries out instructions of a computer program by performing the basic arithmetic, logical, control and input/output (I/O) operations specified by the instructions. For example, the processor 332 and the memory 334 may execute a machine learning algorithm for generating a gesture profile or a model and recognition of a gesture.

The PCB 330 may also include a connection port, which is connected to the electrodes 315a-315g via corresponding wires 320a-320g. The connection port may be a portion of the input module 336. The connection port may include an appropriate connection mechanism to reduce noise. In an aspect, the PCB 330 may further include an analog-to-digital (ADC) configured to convert the analog signal from the electrodes 315 into digital data so that the processor 332 may process the digital data. The data may be sampled at about 10 times per second (10 Hz) or 20 Hz. The sampling frequency may be adjusted based on the needs and requirements. For example, the sampling frequency may be 100 s Hz. When further detail information of gestures is needed, the sampling frequency may be correspondingly increased to a kilo Hz or mega Hz range.

In aspects, the input module 336 may include several ports, such as one or more universal serial buses (USBs), IEEE 1394 ports, parallel ports, and/or expansion slots such as peripheral component interconnect (PCI) and PCI express (PCIe). The input module 336 is not limited to the list but may include other slots or ports that can be used for appropriate purposes. The input module 336 may be used to install hardware or add additional functionalities to the PCB 330. For example, a USB port can be used for adding additional storage to the PCB 330.

In some aspects, the display 338 may be a cathode ray tube (CRT), a liquid crystal display (LCD), or light emitting diode (LED). In some aspects, the display 338 may be a thin film transistor liquid crystal display (TFT-LCD). In some aspects, the display 338 may be an organic light emitting diode (OLED) display. In various some aspects, the OLED display is a passive-matrix OLED (PMOLED) or active-matrix OLED (AMOLED) display. In some aspects, the display 338 may be a plasma display. In some aspects, the display 338 may be interactive (e.g., having a touch screen or a sensor such as a camera, a 3D sensor, etc.) that can receive inputs from the user. In an aspect, the display 338 may be optional so that the display 338 may not be in the PCB.

The network interface 340 may be used to communicate with other computing devices, wirelessly or via a wired connection. The network interface 340 may include but not limited to wireless configurations, e.g., radio frequency, optical, Wi-Fi®, Bluetooth® (an open wireless protocol for exchanging data over short distances, using short length radio waves, from fixed and mobile devices, creating personal area networks (PANs)), and ZigBee® (a specification for a suite of high level communication protocols using small, low-power digital radios based on the IEEE® 802.15.4-2003 standard for wireless personal area networks (WPANs)). Through the network interface 340, the data may be collected from the electrodes 315, and transferred to a managing server.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, C#, Delphi, Fortran, Java, JavaScript, Python, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Figure 4:
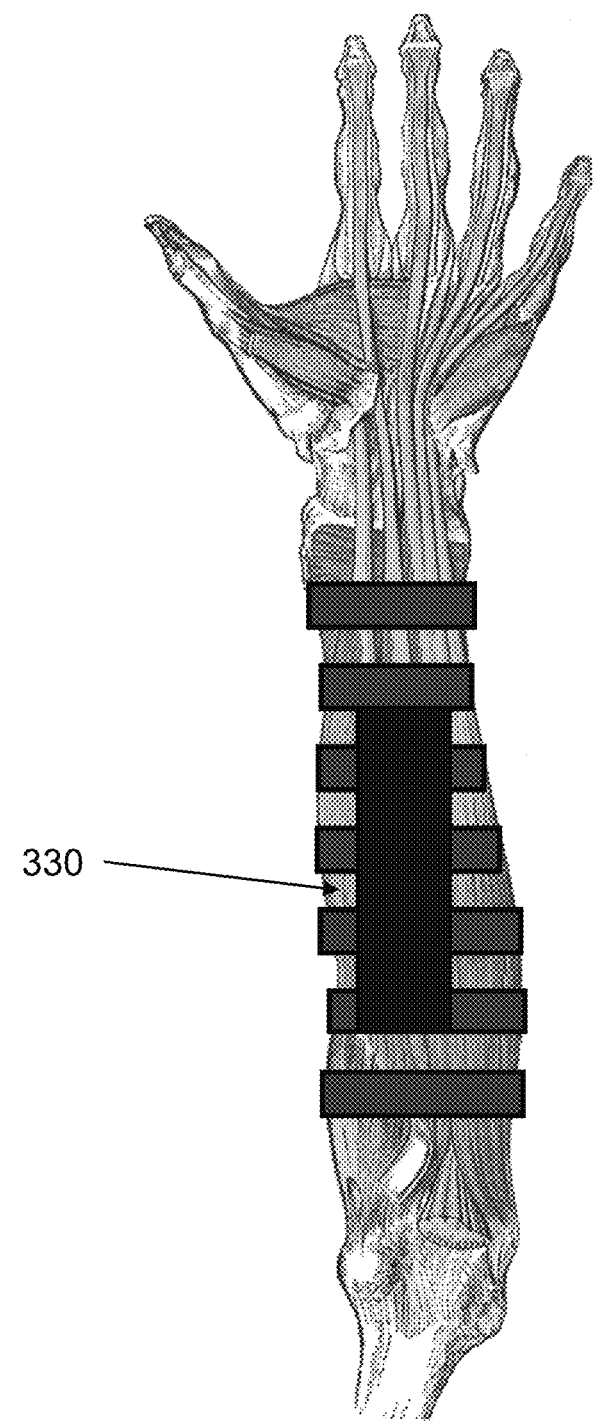
FIG. 4 is a graphical illustration of the gesture recognizing system wrapping around a forearm in accordance with aspects of the present disclosure.

FIG. 4 graphically illustrates the wearable band 300 when it is worn over the forearm of the user. The connections via wires 320a-320g are not shown but are made between the electrodes 315a-315g and the PCB 330. As illustrated, the electrodes 315a-315g or the dielectric layers 310a-310g are substantially equally spaced apart from each other and the PCB 300 is positioned over the electrodes 315a-315g. In an aspect, one more dielectric strap may be positioned and wrap around the elbow so that the gesture of the forearm including movements of the elbow may be recognized.

In aspects, the wearable band 300 may be wrapped around a body portion between joints. For example, the wearable band 300 may be worn over the upper arm or upper thigh. With the wearable bands 300 worn over the upper arm and the lower arm, the gesture recognizing system 100 may be capable of recognizing a gesture with further details including force, position, angle, and spatial relationship of the lower and upper arms, wrist, and hand.

Figure 5:
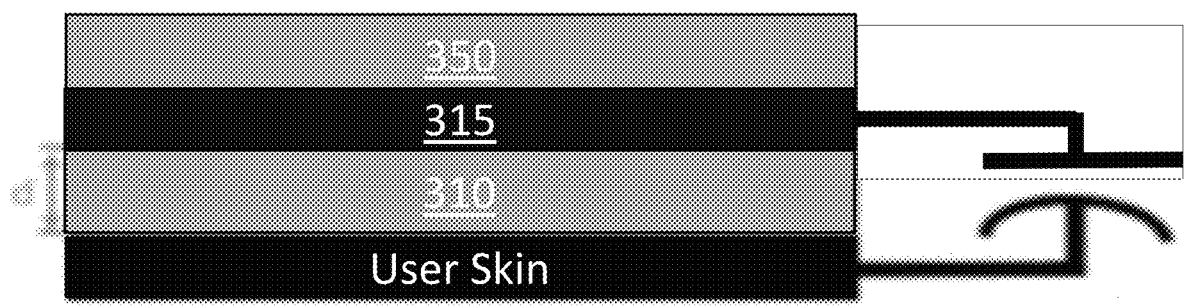
FIG. 5 is an electrical circuit representing the electrode of the gesture recognizing system and a skin of the forearm in accordance with aspects of the present disclosure.

FIG. 5 illustrates a simple electrical circuit model of the electrode 315 and the skin of the user when the wearable band 300 is worn. The electrode 315 functions as a positive electrode and the user's skin functions as a negative electrode or a ground. As such, the electrode 315 and the user's skin form a capacitor. In an aspect, the material of the electrode 315 may be any conductive metal, which is capable of sensing small changes in capacitive values between the skin and the electrode 315. For example, the range of capacitance sensed by the electrode 315 may be of pico-farad range.

The dielectric layer 310 is positioned between the electrode 315 and the user's skin and separates them by a distance, "d," which is the thickness of the dielectric layer 310. In an aspect, the thickness of the dielectric layer 310 may be adjusted to increase or decrease sensitivity of the capacitor, which is the combination of the electrode 315 and the skin.

The capacitance C of a capacitor may be calculated by the following formula:

$$C = \frac{\epsilon_r \epsilon_0 A}{d},$$

where A is the area of the electrode 315, d is distance between the electrode 315 and the skin, $\epsilon_r$ is the dielectric of the dielectric layer 310 separating the electrode 315 and the skin, and $\epsilon_0$ is the dielectric of a vacuum. As such, there is significant dependence in this formula both on proximity to the skin acting as ground and how much surface area of skin is acting as ground.

Also, as shown in FIG. 5, another dielectric layer 350 may cover the electrode 315 to physically protect the electrode 315 and to electrically insulate the electrode 315 from the environment so that noise to the capacitance value is substantially reduced. The dielectric layer 350 may be also stretchable or flexible as the dielectric layer 310 and the electrode 315 are. The material of the dielectric layer 350 may be same as that of the dielectric layer 310 or any other material which is electrically dielectric.

Figure 6:
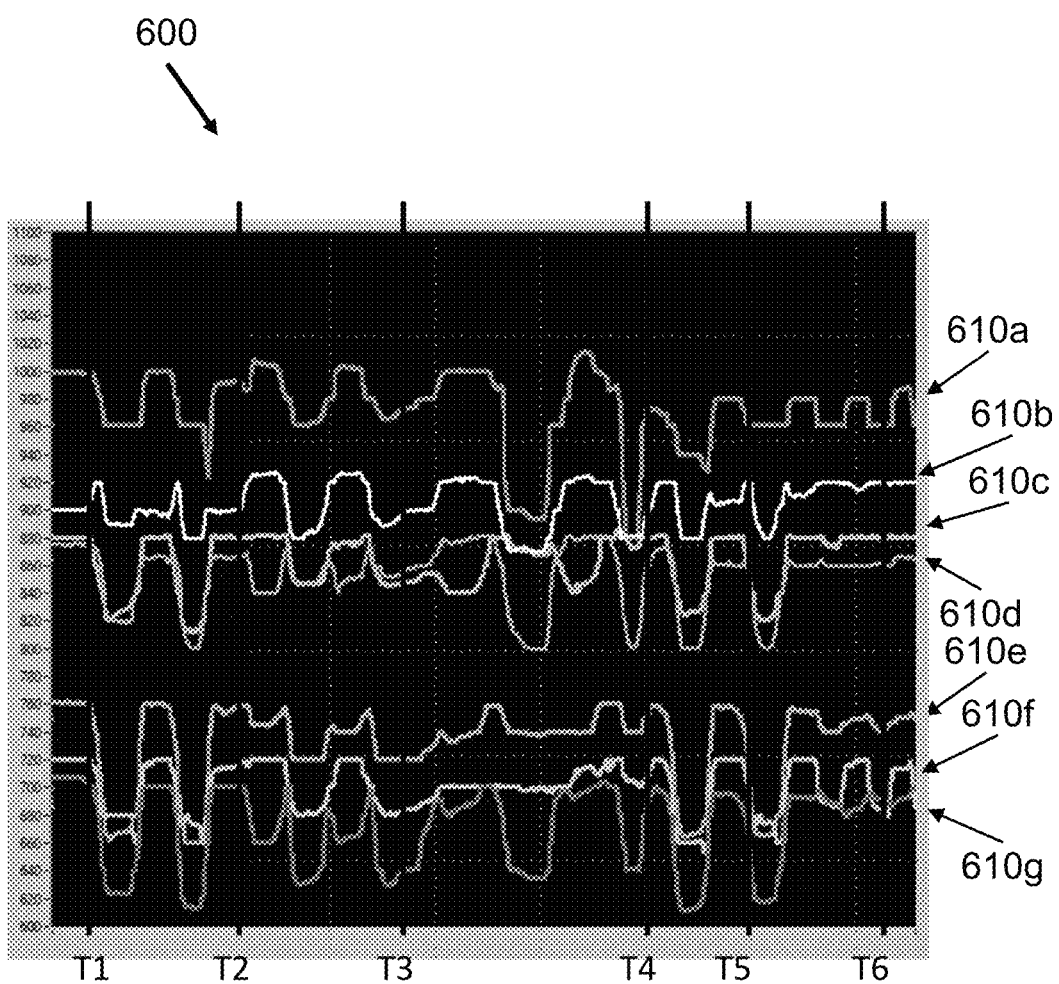
FIG. 6 is a graphical illustration showing measurement data from the electrodes of the gesture recognizing system in accordance with aspects of the present disclosure.

When the hand or wrist of the user moves, the corresponding muscles flex or contract. Correspondingly, the electrode 315 of the wearable band 300 may catch changes in capacitance value between the electrode 315 and the user's skin. FIG. 6 is a graphical illustration of a graph 600 including curves 610a-610g showing changes in capacitance values between the electrodes 315 and the user's skin according to different motions in accordance with aspects of the present disclosure.

The vertical axis of the graph 600 is in unit count, which represents or corresponds to capacitance values, and the horizontal axis of the graph 600 is in time. Thus, the curves 610a-610g show changes in counts from the measurements of the electrodes 315. For example, counts shown in the curve 610a may represent measurement values or capacitance values from the electrode 315a, and counts shown in the curve 610g may represent measurement values or capacitance values from the electrode 315g. In an aspect, the counts from each electrode 315 may be adjusted so that the curves 610a-610g in the graph 600 may not be overlapped and show distinct counts from each other for clearly displaying the curves 610a-610g. In another aspect, the counts may represent the real measurement values or capacitance values. In further aspect, the counts may provide more sensitivity than the real capacitance values and be easier for the machine learning algorithm (or other algorithm) to process in generating a gesture model and recognizing gestures of the forearm.

There are six periods in the horizontal axis, namely, 0-T1, T1-T2, T2-T3, T3-T4, T4-T5, and T5-T6. The first period 0-T1 represents no movements and corresponds to the resting position of the user's hand. The resting position may mean that the forearm is positioned upright and facing forward. During the second period, T1-T2, the user's hand makes gripping and extending motions twice. All curves other than the curve 610b show that the counts drop, meaning that most of muscles within the forearm flex or contract at the same time right after T1 and before T2. These patterns of seven count values may be used to form a capacitive profile for gripping and extending motions.

During the third period, T2-T3, fingers of the hand are extended or unfolded facing forward and the hand is pivoting around the wrist to its side twice. As such, two similar patterns are repeated in the seven curves 610a-610g during the third period.

During the fourth period, T3-T4, while the fingers of the hand are extended, the hand is pivoting at the wrist back and forth twice. Similarly, shown during the third period, two similar patterns are also shown in the seven curves 610a-610g during the fourth period.

During the fifth period, T4-T5, the hand makes gripping and extending motions once. Thus, the pattern during the fifth period appears to be similar to the half of the pattern shown in the second period.

During the sixth period, T5-T6, only the index finger is folded forward to be 90 degrees with respect to the forearm and moving back as much as possible while other fingers maintain the position three times.

As shown in the patterns shown in the graph 600 during the six periods, 0-T6, motions of the hand and wrist have capacitive pattern profiles, which are integrally composed of the seven curves 610a-610g. Thus, one capacitive profile for one motion is different from other capacitive profiles of other motions. In an aspect, the number of electrodes 315 may be two to six with less accuracy than the accuracy with the seven electrodes 315.

With the data obtained from the electrodes 315 showing patterns of curves together with the corresponding motions, the machine learning algorithm may be trained. Specifically, the machine learning algorithm may be trained with annotated data of the capacitive values and the motions. The machine learning algorithm may be trained with or without supervision. The annotated data may be provided with repetition. For example, one user wraps the wearable band 300 around the forearm and puts the forearm at the resting position or at a measuring rig, which is not shown. The user is instructed to make a specific motion with the hand and/or the wrist for a period of time, while measuring the corresponding capacitance values or counts.

The capacitance values are converted to counts to differentiate the counts from each other. The counts are annotated or indicated with the specific motion. Other count data are also collected with other motions and provided to the machine learning algorithm. Since the muscle structure is different from person to person, the training data may be different from person to person. Thus, in an aspect, the wearable band may be used to generate a capacitive profile or model for one person and used to recognize a gesture of the same person. In another aspect, more refined data may be identified for the general public and can be used to train the machine learning algorithm so that the machine learning algorithm may be applied to the general public in recognizing which motion is taken by the forearm.

The machine learning algorithm may be a support vector machine (SVM) learning algorithm with a radial basis function kernel. The SVM casts data onto a hyper-plane using the training points which are closest to decision boundaries and attempts to maximize the center distance between categories. The points closest to or on the boundaries are known as support vectors and the space therebetween is the margin. Support vectors from each class are maximized to increase the margin to its largest possible size. One drawback of SVM is that it has a high processor overhead, which makes it less suitable for embedded systems. For SVM, the commonly accepted default values of a C value equal to number of sensors and a γ of 1/C were used in testing.

In an aspect, the machine learning algorithm may be the K-nearest neighbor (KNN) algorithm to recognize whether cluster-based methods would produce a better model versus linear or hyper-plane separations. KNN works by finding the mode value for each individual class based on finding nearest neighbors of each point in a training set. It works well when there are a reasonably small number of features and its models are easy to update over time with new information. However, because it holds all data in direct memory, it can be very computationally expensive. The number of the nearest neighbors may be but not limited to five.

In another aspect, the machine learning algorithm may employ a random forest (RF) algorithm. The RF is an ensemble method which combines bagging and random feature selection. It operates by growing many decision trees in parallel. Each tree is built on a random selection of observations created through bootstrap sampling of the data and at each node the tree is split using a random selection of features with the goal of maximizing similarity of categories within the resulting subsets of data. This is repeated until a stopping condition is reached. A prediction phase is then entered where the same test data is presented to each tree. At each end leaf node of the tree, the most common category in the node is calculated. The predictions of all trees are then combined via a voting algorithm to provide a final selection model. Advantages of the RF algorithms include the fact that they work for both classification and regression problems, have fairly low processor overhead, and that the analysis of many feature combinations in parallel allows for recognition of relative importance of individual features.

In further aspect, the machine learning algorithm may include a 10-fold validation method, which is a common way of validating machine learning models against unknown data. In 10-fold models, all samples from a single class are combined and then randomly shuffled. In this case, all data from the five iterations of a single grasp or gestures for each subject were combined before splitting into ten stratified samples. Stratified means that within each sample, the number of members in a given class is proportional to the overall data set. For each iteration, 9 of the stratified samples are used to teach a machine learning model, and the 10th is used to test the model. This is then repeated for nine more iterations until each subset has been used once as a test model. The mean of prediction accuracy and variance are calculated. These values represent the expected performance of the algorithm on real world data.

Figure 7:
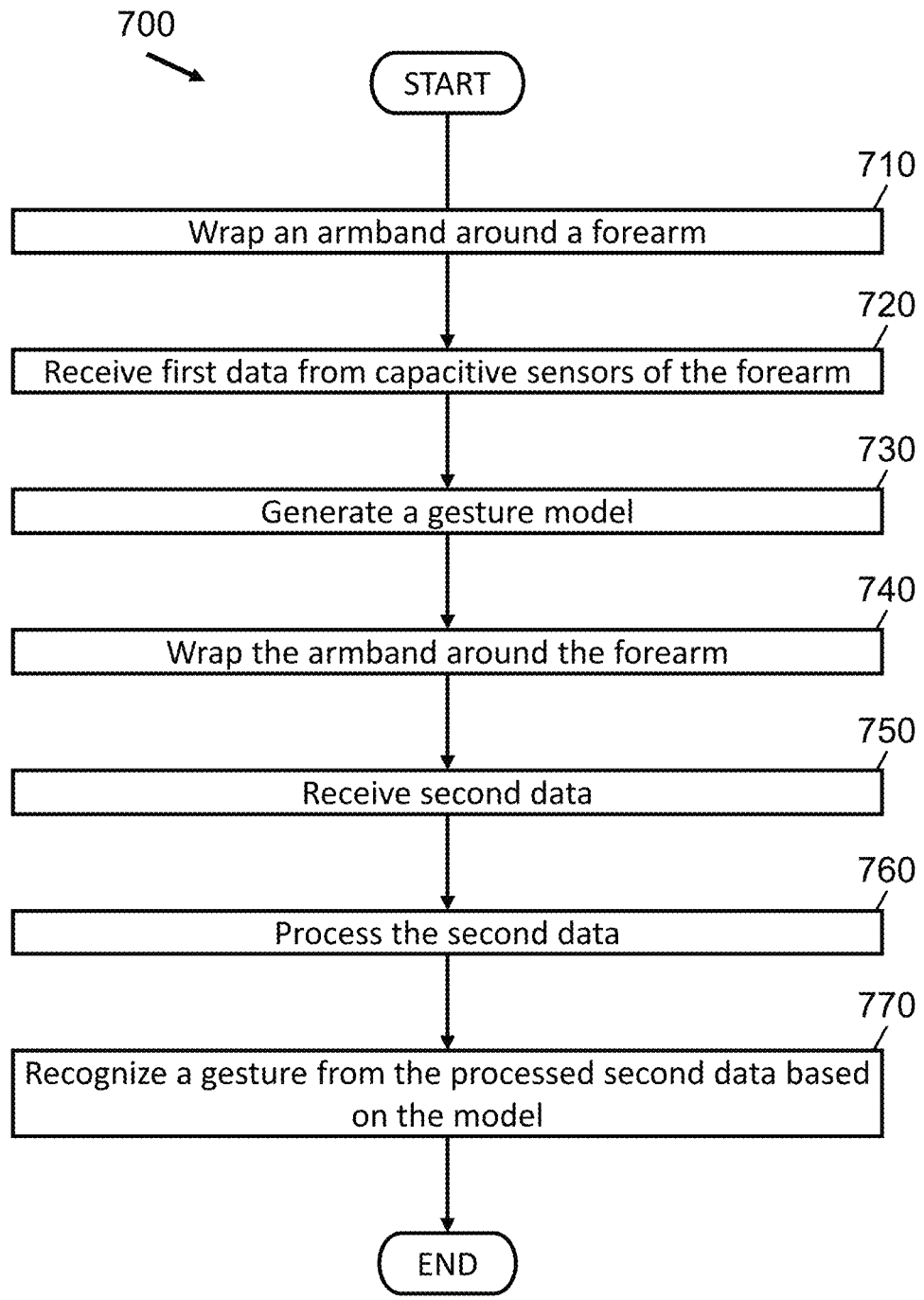
FIG. 7 is a flowchart illustrating a method for recognizing a gesture in accordance with aspects of the present disclosure.

FIG. 7 illustrates a method 700 for recognizing a motion based on capacitance values or counts in accordance with aspects of the present disclosure. The method 700 is composed with two stages, a training stage including steps 710-730 and recognition stage including steps 740-770. During the training stage, a model is generated and during the recognition stage, a motion is recognized based on the capacitance values.

During the training stage, a wearable band (e.g., the wearable band 300 of FIG. 3) is wrapped around a forearm of a user in step 710. In step 720, specific motions and the corresponding data or first data from the electrodes of the wearable band is collected. In an aspect, repetitive data may be collected during step 720.

In step 730, a machine learning algorithm is trained with the collected data, which has been annotated, and generates a motion model. The machine learning algorithm may be further refined with more data to generate a motion model with higher accuracy.

After the model is generated, the wearable band may be wrapped around the forearm of the user in step 740. When the user makes a motion, the electrode of the wearable band generates second data from each of the electrodes and relays the date to a processing device (e.g., the PCB 330 or a microcomputer) in step 750.

The second data may be processed in step 760 by a machine learning algorithm, and in step 770, the machine learning algorithm may recognize a gesture from the processed data based on the model generated during the training stage. This recognition method 700 may be used in but not limited to medical field, prosthetic field, and gaming field.

It should be understood that various aspects disclosed herein may be combined in different combinations than the combinations specifically presented in the description and accompanying drawings herein. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, the wearable band.

What is claimed is:

1. A gesture recognizing system for recognizing gestures, the gesture recognizing system comprising:
    a wearable band configured to wrap around an appendage of a user, the wearable band including:
        a first dielectric layer; and
        a plurality of stretchable circumferential electrodes affixed on an outer surface of the first dielectric layer,
        wherein, when the first dielectric layer of the wearable band wraps around the appendage, each stretchable circumferential electrode wraps around a respective circumference of the appendage and is configured to form a capacitive sensor with skin of the user; and
    a printed circuit board (PCB) including:
        a processor; and
        a data collection hardware configured to collect data from capacitive sensors,
    wherein the processor is configured to process the collected data to monitor changes in capacitance between the stretchable circumferential electrode and the skin and to recognize a gesture of the appendage of the user based on the changes in capacitance.

2. The gesture recognizing system according to claim 1, wherein the appendage is a forearm or a lower leg.

3. The gesture recognizing system according to claim 1, wherein the collected data includes capacitance values between the skin and the capacitive sensors.

4. The gesture recognizing system according to claim 1, wherein the capacitance values are measured with the skin being a ground.

5. The gesture recognizing system according to claim 1, wherein the capacitance values vary based on a change in shapes of muscles in a cross-sectional area of the appendage as a gesture of the appendage changes.

6. The gesture recognizing system according to claim 1, further comprising:
a plurality of wires, each wire being configured to connect a corresponding stretchable circumferential electrode to a corresponding port of the PCB.

7. The gesture recognizing system according to claim 6, wherein a sampling frequency of the capacitive sensors is at least about 10 Hz.

8. The gesture recognizing system according to claim 1, further comprising:
an analog to digital converter (ADC) configured to convert analog data from the capacitive sensors to digital data.

9. The gesture recognizing system according to claim 1, wherein the processor recognizes the gesture according to a model.

10. The gesture recognizing system according to claim 9, wherein the model is trained by a machine learning ("ML") algorithm, which generates a model between gestures and previously collected data.

11. The gesture recognizing system according to claim 1, wherein the first dielectric layer includes an attachment mechanism.

12. The gesture recognizing system according to claim 11, wherein the attachment mechanism includes a hook-and-loop fastener strap, a buckle, or a zipper configured to securely wrap the wearable band around the appendage.

13. The gesture recognizing system according to claim 1, wherein the first dielectric layer is an elastomeric material.

14. The gesture recognizing system according to claim 1, wherein the plurality of stretchable circumferential electrodes are stretchable.

15. The gesture recognizing system according to claim 1, wherein the wearable band further includes a second dielectric layer affixed over the plurality of stretchable circumferential electrodes and the first dielectric layer.

16. The gesture recognizing system according to claim 1, wherein the plurality of stretchable circumferential electrodes are substantially equally distributed along a length direction of the appendage.

17. The gesture recognizing system according to claim 1, wherein at least one of the plurality of stretchable circumferential electrodes is configured to wrap around an elbow of the user.

18. The gesture recognizing system according to claim 17, wherein the processor further recognizes a gesture of the elbow.

19. A method for recognizing gestures of an appendage, the method comprising:
in a modelling stage:
wrapping a wearable band around an appendage of a user, wherein each of a plurality of stretchable circumferential electrodes of the wearable band wraps around a respective circumference of the appendage to form a capacitive sensor with skin of the user;
receiving first data from a plurality of capacitive sensors of the wearable band, where the first data includes capacitance values from the plurality of capacitive sensors and corresponding gestures of the appendage; and
generating a model of the user from the first data by using a machine learning algorithm;
in a recognition stage:
wrapping the wearable band around the appendage of the user, wherein each of the plurality of stretchable circumferential electrodes of the wearable band wraps around a respective circumference of the appendage to form a capacitive sensor with the skin of the user;
receiving second data from the plurality of capacitive sensors;
processing the second data to monitor changes in capacitance between the stretchable circumferential electrode and the skin; and
recognizing a gesture of the appendage based on the changes in capacitance and the model.

20. A non-transitory computer-readable medium including instructions stored thereon that, when executed by a computer, cause the computer to perform a method for recognizing gestures of an appendage, the method comprising:
in a modeling stage:
wrapping a wearable band around an appendage of a user, wherein each of a plurality of stretchable circumferential electrodes of the wearable band wraps around a respective circumference of the appendage to form a capacitive sensor with skin of the user;
receiving first data from a plurality of capacitive sensors, where the first data includes capacitance values from the plurality of capacitive sensors with gestures of the appendage; and
generating a model of the user from the first data by using a machine learning algorithm; and
in a recognition stage:
wrapping the wearable band around the appendage of the user, wherein each of the plurality of stretchable circumferential electrodes of the wearable band wraps around a respective circumference of the appendage to form a capacitive sensor with the skin of the user;
receiving second data from the plurality of capacitive sensors;
processing the second data to monitor changes in capacitance between the stretchable circumferential electrode and the skin; and
recognizing a gesture of the appendage based on the changes in capacitance and the model.

* * * * *